United States Patent [19]
Voth et al.

[11] 3,754,625
[45] Aug. 28, 1973

[54] VEHICLE FINAL DRIVE WITH PLANETARY GEARING AND FRICTION BRAKE

[75] Inventors: James W. Voth; Albert J. Speck, both of Springfield, Ill.

[73] Assignee: Allis-Chalmers Corporation, Milwaukee, Wis.

[22] Filed: June 7, 1972

[21] Appl. No.: 260,630

[52] U.S. Cl. .................. 192/4 A, 74/391, 74/801
[51] Int. Cl. ..... F16h 57/10, F16h 35/00, F16h 1/28
[58] Field of Search .............................. 74/391, 801; 180/43 B; 192/4 A

[56] References Cited
UNITED STATES PATENTS

| | | | |
|---|---|---|---|
| 2,953,040 | 9/1960 | Christenson et al. | 74/801 X |
| 3,043,155 | 7/1962 | Salna | 74/391 |
| 3,150,532 | 9/1964 | Bixby | 74/391 |
| 3,184,985 | 5/1965 | Dreitzler | 74/391 X |
| 3,184,994 | 5/1965 | Stahl | 74/674 |
| 3,301,359 | 1/1967 | Cole et al. | 192/4 A |
| 3,382,958 | 5/1968 | Fagel | 192/4 A |

*Primary Examiner*—Arthur I. McKeon
*Attorney*—Charles L. Schwab et al.

[57] ABSTRACT

A planetary final drive and brake are incorporated within a wheel hub of a land vehicle with the ring gear structure nonrotatably connected to the end of a stationary hollow axle through which a drive shaft extends and carries a sun gear and brake disc. The ring gear structure carries friction pads and a hydraulic actuator for the friction brake and fluid is routed to the hydraulic actuator by way of passages in the stationary hollow axle and the ring gear structure.

11 Claims, 1 Drawing Figure

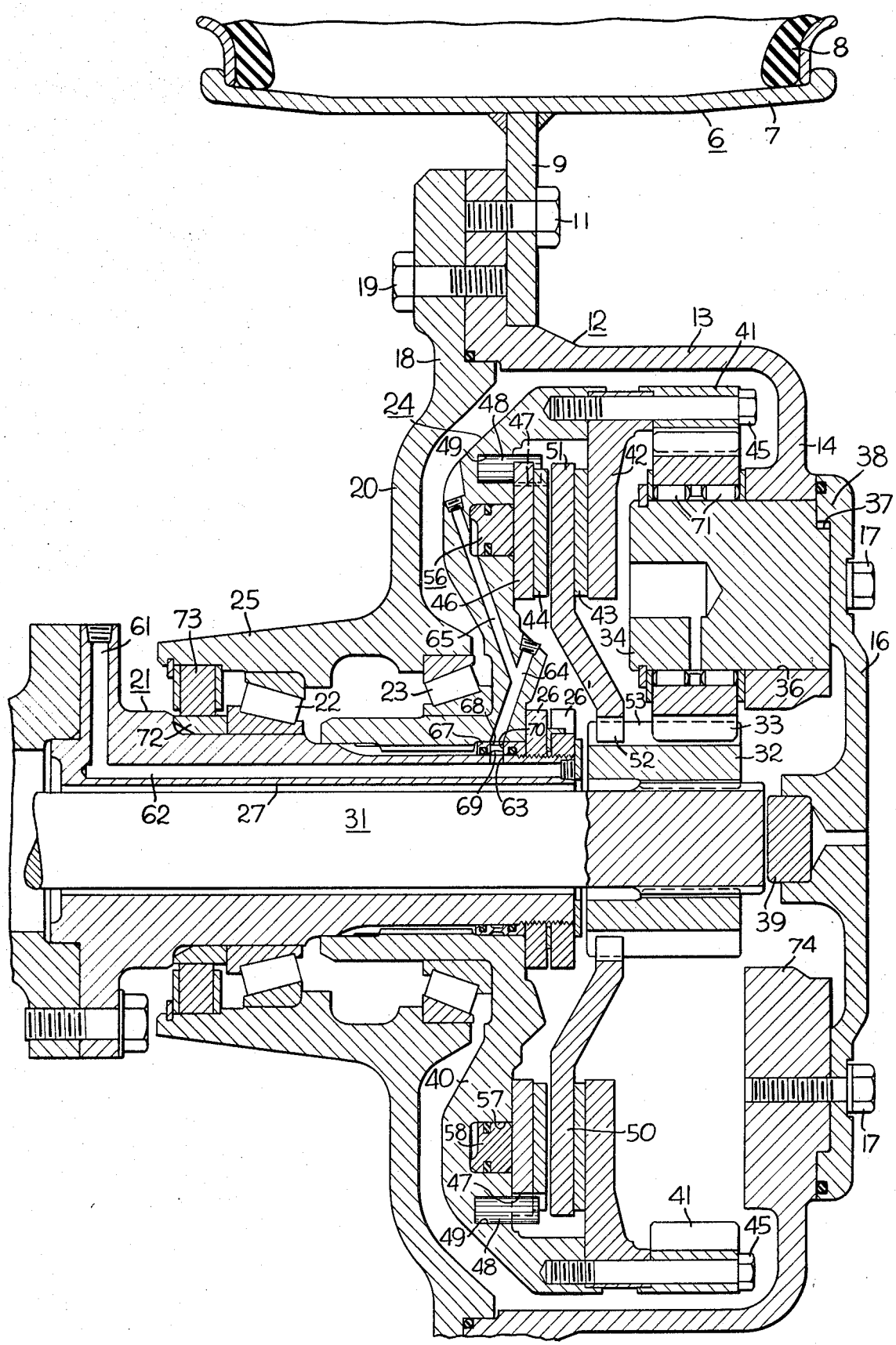

VEHICLE FINAL DRIVE WITH PLANETARY GEARING AND FRICTION BRAKE

BACKGROUND OF THE INVENTION

Heretofore, others have provided planetary final drives wherein the ring gear is connected to a stationary hollow axle through which a drive shaft extends and has connected thereto a sun gear. One such construction is shown in U.S. Pat. No. 2,893,268. Also heretofore, others have provided a wet brake and planetary gearing within the hub of a wheel, one such construction being shown in U.S. Pat. No. 1,316,057. Also others have heretofore suggested that a sun gear of a planetary gear set be braked to effect wheel braking, one such construction being shown in U.S. Pat. No. 3,095,762.

BRIEF DESCRIPTION OF THE INVENTION

In the present invention a planetary gear set and oil cooled brake is incorporated within the hub of a final drive member such as a vehicle wheel. More specifically, the ring gear structure in the present invention is splined to the end of a hollow axle and carries the friction pads and hydraulic actuator for a disc brake, the disc of which is splined to the teeth of the sun gear carried by the end of the drive shaft extending through the hollow axle. Fluid under pressure is conveyed to the hydraulic actuator in the ring gear structure by passages in the hollow axle and ring gear structure.

DETAILED DESCRIPTION OF THE INVENTION

Referring to the drawing the final drive of this invention is illustrated in a ground engaging traction means in the form of a rubber tired wheel 6. The wheel includes a rim 7 on which a rubber tire 8 is mounted and which has an annular flange 9 secured by a plurality of cap screws 11 to a hollow drive hub 12. The drive hub includes an outer part 13 which has an outer wall 14 closed by a cap 16 secured thereto by a plurality of cap screws 17. An axially inner part 18 of the hub 12 is secured to the outer part 13 by a plurality of cap screws 19 and presents an inner wall 20. The inner part 18 of the hub 12 includes a collar 25 which defines an axial opening through which a stationary hollow axle 21 extends. The collar is rotatably mounted on the axle 21 by a pair of axially spaced tapered roller bearings 22, 23. The inner raceway of bearing 22 is press fit on the axle 21 and axially abuts a spacer ring 72 which has a finished outer diameter in sealing engagement with a seal 73. The inner raceway of bearing 23 is press fit onto a hub part of a ring gear structure 24 which is splined to the end of axle 21. The outer raceways of the antifriction bearings 22, 23 are press fit in internal bores of the collar 25. The ring gear structure 24 is adjusted axially to properly adjust the bearings 22, 23 and is held in such axial position by a pair of locknuts 26, 26'.

A drive shaft 31 extends through the interior bore 27 of the hollow axle 21 and has a sun gear 32 splined to its outer free end extended into the interior of the hollow hub 12. A planet pinion 33 is rotatably mounted on a stub shaft 34 press fit in bore 36 of the outer wall 14. The axially outer end of the stub shaft 34 is notched at 37 to receive a shoulder 38 of the cap 16 which prevents the stub shaft 34 from rotating should it become loosened during operation. An annular opening 74 in outer wall 14 is sufficiently large to permit removal of sun gear 32 upon removal of cap 16. The cap 16 also carries a replaceable thrust button 39 for carrying any end thrust that the rotating drive shaft 31 might exert.

The ring gear structure 24 is basically a three part structure including a main, radially extending part 40, a ring gear 41 and an intermediate radially inward projecting flange member 42 all of which are secured to one another by a plurality of cap screws 45. A unique brake 50 for the wheel is provided between the drive shaft 31 and the stationary ring gear structure 24. The brake includes a pair of axially spaced annular friction pads 43, 44 on axially opposite sides of annular brake disc 51. The pad 43 is secured as by bonding to flange part 42 and the pad 44 is bonded to annular washer 46 which has notches 47 engaging pins 48 press fit in bores 49. The brake disc 51 has spline-like teeth 52 which are in splined engagement with the teeth 53 of the sun gear 32. The spline fit between the teeth 52 and 53 is sufficiently loose to permit axial shifting of the disc 51 on the sun gear 32, thus insuring centering of the disc between the brake pads 43, 44.

A hydraulic actuator 56 for selectively operating the friction brake 50 is incorporated into the ring gear structure 24 and includes an axially open annular recess 57 formed in the part 40 of the ring gear structure 24 and an annular piston 58 operatively disposed within recess 57 for movement axially relative to the brake disc 51. Hydraulic fluid is supplied to the actuator 56 through passages 61, 62 and 63 in the stationary axle 21 and passages 64, 65 in the ring gear structure 24. The fluid passing from passage 63 of the stationary axle 21 to passage 64 in the ring gear structure passes through a sleeve 67 having annular grooves 68, 69 interconnected by drilled passages 70.

The planetary gearing, that is sun gear 32, planet gears 33 and ring gear 41 are lubricated by a suitable lubricant contained within the hollow hub which also serves to cool the friction brake 50. The beforementioned lubricant also lubricates the planet pinion bearings 71 and the wheel bearings 22, 23. The lubricant is sealed within the hollow hub by a conventional oil seal 73.

From the foregoing description of the present invention, it is apparent that a compact planetary final drive with friction brake has been provided which is economical to manufacture because of its well conceived design. It should also be apparent from the disclosure of the present invention that the brake requires less torque to effect braking of the vehicle wheels because the braking is between the sun gear and the ring gear. By placing the brake disc on the sun gear and the friction pads on the ring gear structure, the space requirements for the friction brake have been minimized. The cylinder component of the brake actuator is integral with the ring gear structure thus saving the expense of a separate cylinder. It should be understood that three equally spaced planet pinions 33 are used in the planetary gear train thus allowing the sun gear 32 to be self-centering.

The embodiments of the invention in which an exclusive property or privilege is claimed are defined as follows:

1. In a vehicle final drive, the combination comprising:
   a hollow nonrotating axle having an open end,
   ground engaging traction means including a hollow drive hub having an axially inner wall presenting an axial opening through which said axle extends, and a closed axially outer wall spaced axially from said inner wall and from said open end of said axle, bearing means rotatably mounting said inner wall on said axle, a drive shaft within said axle having one end extending axially beyond said open end of said axle, a sun gear nonrotatably mounted on and in coaxial relation to said end of said drive shaft, a ring gear structure nonrotatably secured to said open end of said axle and having an internal ring gear, a plurality of circumferentially spaced planet pinions rotatably mounted on said outer wall of said wheel hub and each in mesh with said sun and ring gears, and a selectively actuated brake between said end of said drive shaft and said ring gear structure.

2. The invention of claim 1 wherein said brake includes a brake disc connected in coaxial relation to said drive shaft for rotation therewith.

3. The invention of claim 2 wherein said brake disc is connected to and rotates with said sun gear.

4. The invention of claim 3 wherein said brake disc is splined to said sun gear whereby said disc is free to float axially relative to said sun gear.

5. The invention of claim 4 wherein said brake includes a pair of friction pads on said ring gear structure engageable, respectively, with opposite axial sides of said disc.

6. The invention of claim 5 wherein said brake includes a hydraulic actuator on said ring gear structure operatively associated in axial thrust transmitting engagement with at least one of said pads and selectively operable to bring said pads into frictional braking engagement with said disc.

7. The invention of claim 6 wherein said bearing means includes a pair of axially spaced antifriction bearings and wherein at least one of said bearings is mounted on said ring gear structure.

8. The invention of claim 7 and further comprising passages in said axle and ring gear structure for conveying hydraulic fluid to said hydraulic actuator.

9. The invention of claim 8 wherein said hub contains lubricating fluid serving to lubricate and cool said bearings, gears and brake.

10. The invention of claim 9 wherein said hydraulic actuator includes an annular axially opening recess formed in said ring gear structure and an annular piston operatively disposed in said recess for movement axially of said brake disc.

11. The invention of claim 1 wherein said outer wall includes an axial opening aligned with and sufficiently large to permit axial removal of said sun gear therethrough and a releasable cap normally covering said opening.

* * * * *